United States Patent [19]

Howell

[11] Patent Number: 4,522,375
[45] Date of Patent: Jun. 11, 1985

[54] ELECTRICAL LIFT FOR TRAILERS

[76] Inventor: Carmen Howell, Rte. 1, Box 869, Owasso, Okla. 74055

[21] Appl. No.: 452,944

[22] Filed: Dec. 27, 1982

[51] Int. Cl.³ .............................................. B60S 9/02
[52] U.S. Cl. .................................................. 254/425
[58] Field of Search ................. 254/45, 419, 420, 425

[56] References Cited

U.S. PATENT DOCUMENTS 3,784,160  1/1974  Phillips .................................. 254/45
4,129,322 12/1978  Kuntz ................................... 254/419

Primary Examiner—Robert C. Watson
Attorney, Agent, or Firm—Head, Johnson & Stevenson

[57] ABSTRACT

An electrical lift for use with a fifth trailer a housing being supported to the trailer and having a vertically and telescopically downwardly extending support post, a horizontal shaft extending from the housing and connected by gear means within the housing so that the rotation of the horizontal shaft retracts or extends the support post, a gear on the horizontal shaft externally of the housing, a gear motor having a shaft extending from it with a gear and including a chain drive connecting the two gears together so that the gear motor rotates the horizontal shaft, a battery, and a reversible switch means connecting the battery to the gear motor so that the vertical support may be extended to raise the trailer forward portion or withdrawn to lower the trailer, thereby facilitating the coupling of the trailer fifth wheel portion to a towing vehicle.

2 Claims, 8 Drawing Figures

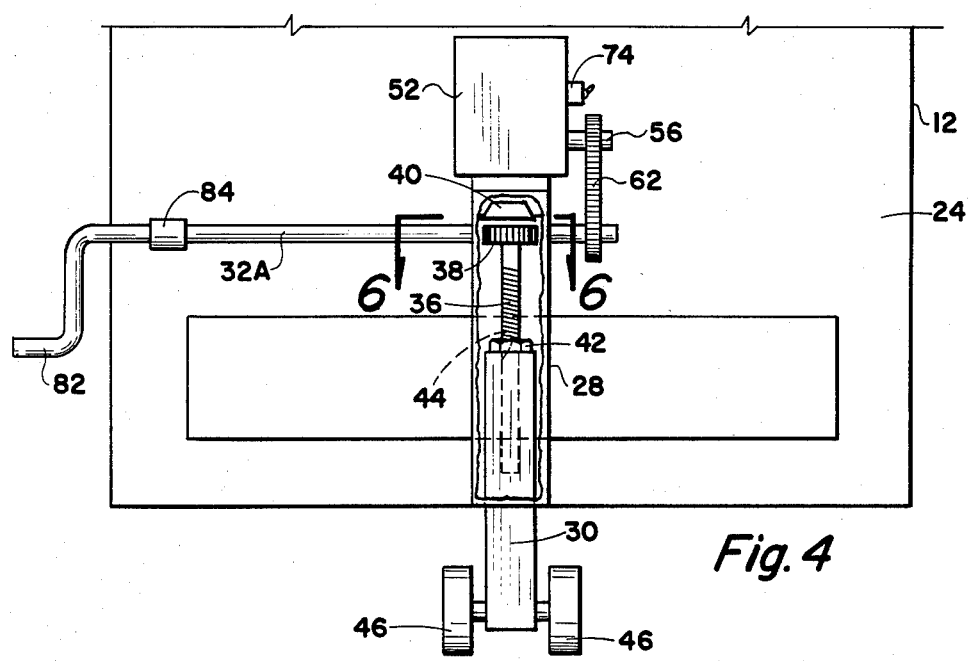
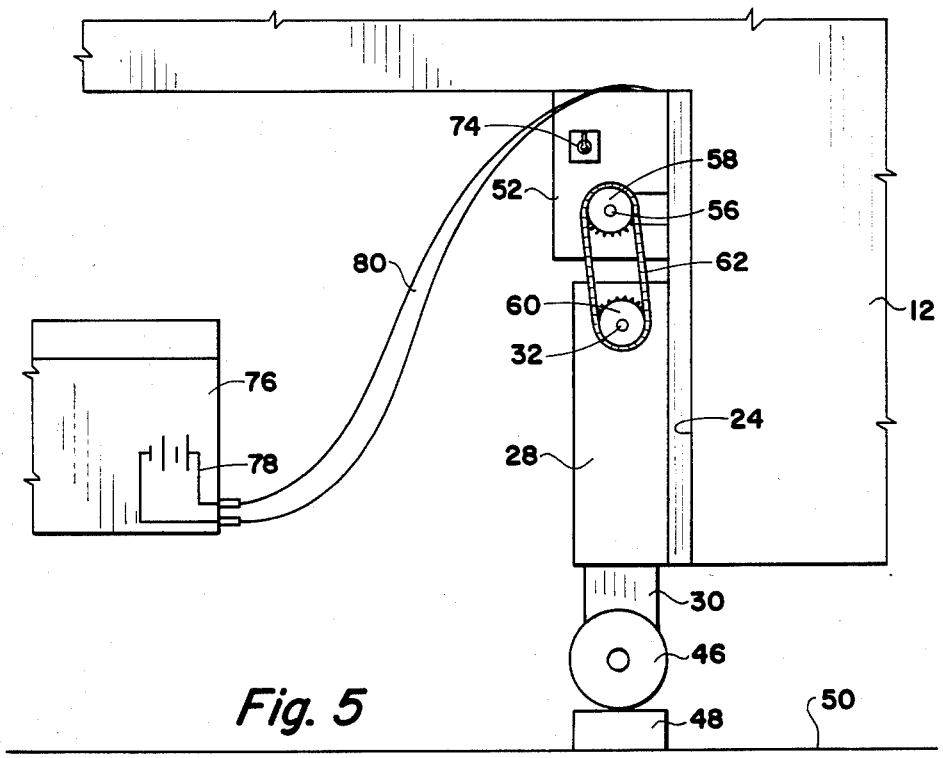

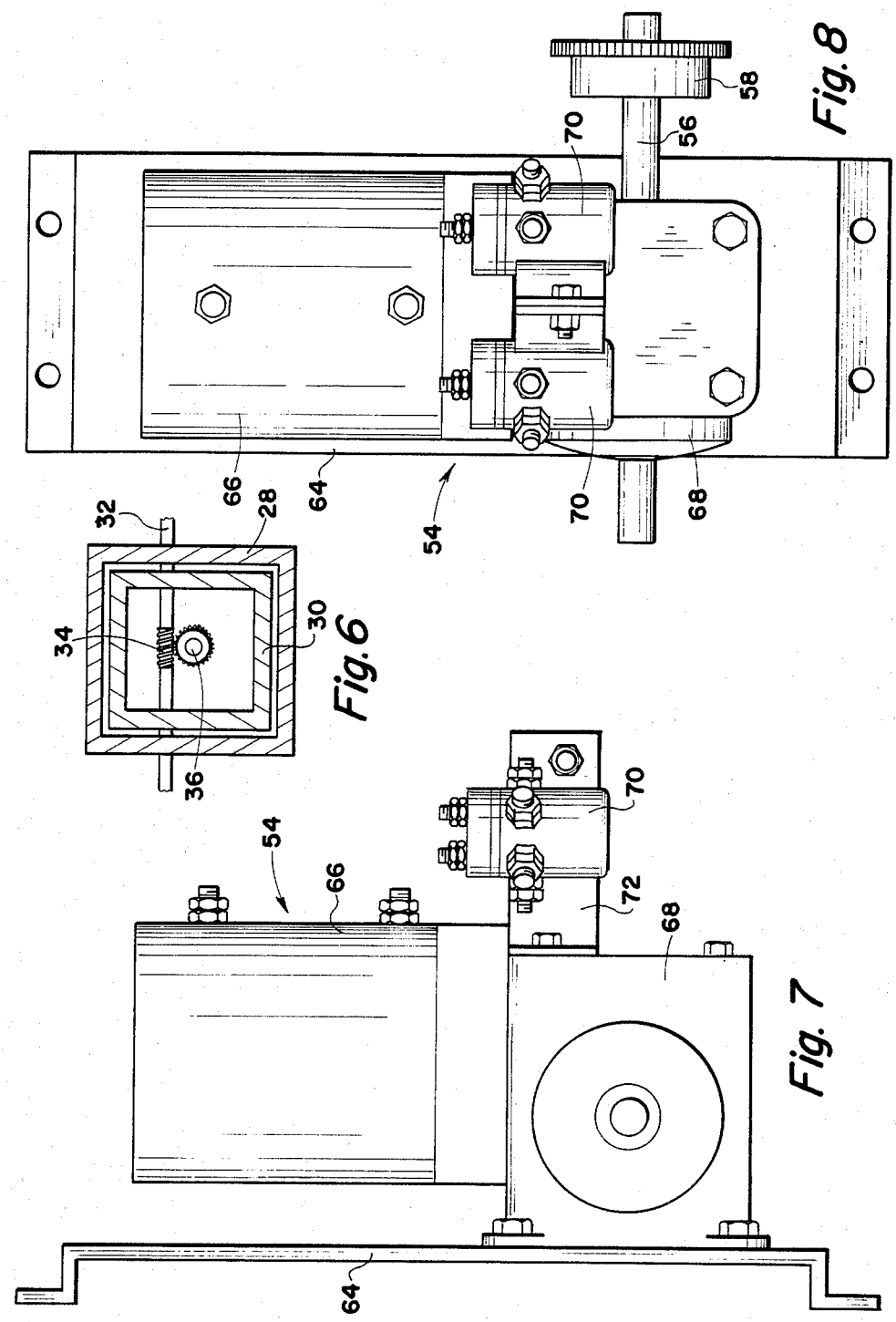

ELECTRICAL LIFT FOR TRAILERS

BRIEF SUMMARY OF THE INVENTION

A common means of connecting a trailer to a towing vehicle is the use of a fifth wheel arrangement. While fifth wheel connections have long been used as a means of connecting a truck to a cargo trailer, the application of this type of towing arrangement for other types of trailers has come into vogue only in recent years. Fifth wheel type towing devices are particularly useful where the towing vehicle is a pickup truck. The fifth wheel pivotal connection can be secured to the bed of the pickup truck and with a gooseneck type arrangement the trailer can then be coupled to the pickup. Trailers of this type are used for recreational vehicles, for hauling horses, and for other means where a large trailer capacity is required.

One of the problems in using these type devices is that of connecting and disconnecting the trailer from the towing vehicle. Since an advantage of the fifth wheel type arrangement is to transfer a portion of the load of the trailer to the towing vehicle, the front end of the trailer has significant weight. To disconnect the trailer from the towing vehicle it is necessary to lift this weight so that the coupling between the trailer and the vehicle can be disengaged; and in like manner, when connecting the trailer to the towing vehicle, the forward end of the trailer must be lowered into position.

In the past, a manual jacking means has been commonly employed to lift the trailer, but this arrangement is extremely slow and requires a significant amount of energy and strength. The present invention provides a means of utilizing electrical energy such as supplied by a battery, for easily raising and lowering a fifth wheel type trailer for connecting or disconnecting the trailer from a towing vehicle.

The device of the invention includes a housing affixed to the trailer adjacent the forward end and, preferably, to a forward vertical wall of the trailer rearwardly of the fifth wheel connection but forwardly of the trailer wheels. Telescopically received in the housing is a vertical support post. A gear arrangement is provided within the housing wherein a screw thread means telescopically extends or withdraws the vertical support post. An electric gear motor has a shaft extending from it with a drive gear. A driven gear is connected to a shaft extending from the housing for operation of a worm gear within the housing. The drive gear and driven gear are connected by a chain. With a reversing switch arrangement connecting the gear motor to an electrical battery source, the gear motor, when energized, drives the shaft extending from the housing to advance or retract the vertical support post. When the support post is advanced, it engages the earth's surface, or a member sitting on the earth's surface, to raise the trailer and to thereby allow it to be disconnected from a towing vehicle. When the direction of rotation of the shaft is reversed, the telescopic support post is withdrawn within the housing, lowering the trailer so as to attach it to a towing vehicle.

In order to ensure the ability to connect or disconnect the trailer in the event of power failure, a crank may be removably connected to the shaft extending from the housing. The shaft can be manually rotated to raise and lower the trailer.

BRIEF DESCRIPTION OF THE DRAWINGS

FIG. 4 is an enlarged elevational view of a mechanism for employing the principles of the invention.

FIG. 5 is a side view of the mechanism as shown in FIG. 4 and showing the support post extended so that the lower end thereof is resting on a block.

FIG. 6, is a cross-sectional view taken along the line 6—6 of FIG. 4 showing means of coupling the horizontal shaft for the rotation of a worm gear within the housing to effect the extension or retraction of the support post.

FIG. 7 is a side elevational view of a gear motor with its solenoid control mechanism as may be employed in practicing the invention.

FIG. 8 is a front elevational view of the gear motor of FIG. 7.

DETAILED DESCRIPTION

Figure 1:
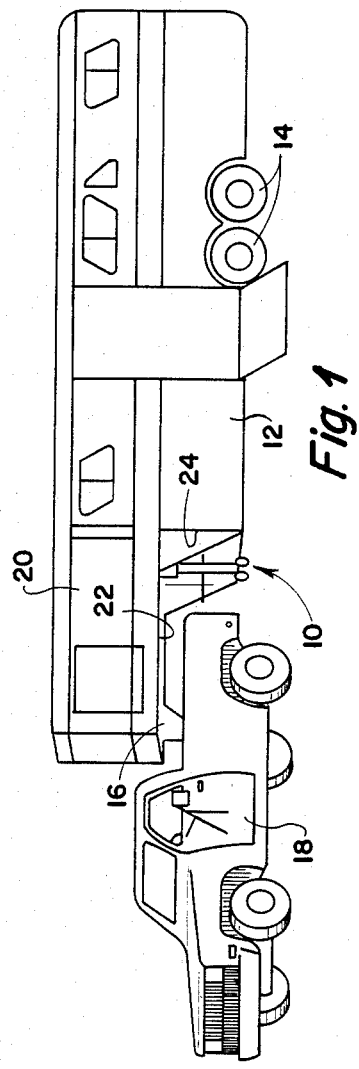
FIG. 1. is an elevational side view of a typical trailer employing the principles of the invention. The trailer is connected by a fifth wheel arrangement to a towing vehicle.

Referring to the drawings and first to FIG. 1, a mechanism for practicing the invention, that is, for electrically lifting a trailer to assist in connecting or disconnecting the trailer from a towing vehicle is generally indicated by the numeral 10. The mechanism is shown attached to a fifth wheel type trailer 12 such as of the type which may be used in transporting horses. The trailer 12 has wheels 14 and at the forward end thereof a downwardly extending gooseneck structure 16 by which the trailer is connected to a pickup truck 18.

In order to provide for the fifth wheel type connection of the trailer 12, the forward end portion 20 has a lower edge 22 which is of increased height compared to the rest of the trailer. This provides for a vertical wall 24 which is intermediate the gooseneck support 16 and wheels 14.

Figure 3:
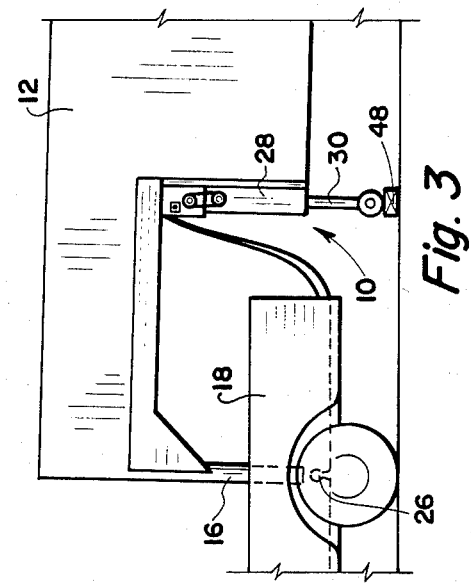
FIG. 3 is a view as in FIG. 1 but showing the trailer lift extended so that the trailer is disconnected from the towing vehicle.
Figure 2:
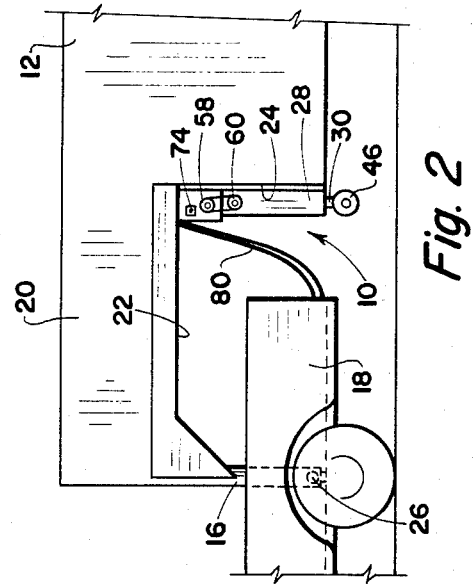
FIG. 2 is a fragmentary enlarged view of the rearward portion of the towing vehicle and the forward portion of the trailer of FIG. 1 and showing the mechanism of this invention for raising and lowering the trailer, the mechanism being shown in the retracted position in which the trailer is attachd to the towing vehicle.

FIG. 2 shows the gooseneck portion 16 extending downwardly to rotatably receive a ball or other type of pivotal connection 26 supported by the truck 18. In FIG. 2 the trailer is connected to the truck ready to be towed by it. FIG. 3 shows the forward portion of the trailer lifted slightly to disengage the gooseneck fifth wheel portion 16 from the pivotal connection 26. The truck 18 may then be disconnected from a trailer 22. It is the mechanism 10 for raising the truck to the position as shown in FIG. 3 or lowering it into the position as shown in FIG. 2 which is the essence of the present invention, and this mechanism is best seen with reference to FIGS. 4, 5, and 6.

FIG. 4 shows the forward wall 16 of the trailer 12. Affixed to this forward wall is a housing 28 which is preferably of rectangular or square cross-sectional configuration. The housing telescopically receives a vertical support post member 30. As shown in the cross-sectional view of FIG. 6, the support post member 30 is of comparable cross-sectional configuration as the housing so that it is telescopically slidable within the housing and supported in a vertical position by the housing. Extending through the upper portion of the housing 28 is a horizontal shaft 32 having a worm gear 34 retained on the shaft within the internal of housing 26. Within the interior of the housing 28 is a vertical externally threaded shaft 36 having a sprocket gear 38 attached adjacent the upper end. A thrust bearing 40 is secured within the upper end of the housing 28 and receives the upper end of shaft 36. A plate 40 is secured to the upper end of the support post mechanism 30, the plate 42 having a threaded opening 44 therein which threadably receives shaft 36. It can be seen that when shaft 36 is rotated the support post member 30 is telescopically extended or withdrawn relative to housing 28.

At the lower end of the vertical support post member 30 are wheels 46 which engage the earth's surface, or some member supported on the earth surface, such as a block 48, when the vertical member 30 is downwardly extended, the earth surface being indicated by the numeral 50.

Positioned above the housing 28 is a gear motor retained within a cover 52 as shown in FIGS. 4 and 5 but which is shown in greater detail without the cover in FIGS. 7 and 8. Extending from the gear motor, which is indicated generally by the numeral 54 in FIGS. 7 and 8, is a drive shaft 56 having a drive gear 58 thereon exterior of housing 52. In like manner, the horizontal shaft 32 has a driven gear 60 which is in alignment with gear 58. A chain 62 couples gears 58 and 60.

FIGS. 7 and 8 show one embodiment of the gear motor 54 with the cover removed. It is supported on a base 64 which is secured to the vertical wall 24 of trailer 12. Mounted on the base 64 is the gear motor consisting of an electrical motor 66, which preferably is of a dc low voltage type, having connection to a gearbox 68 which has the drive shaft 56 extending from it. Solenoids 70 mounted on a bracket 72 are employed for applying electrical energy in the appropriate orientation to motor 66 to control the direction of rotation of the motor and thereby control the direction of rotation of shaft 56. The electrical connection to motor 66 is not illustrated since it is typically any well-known circuit which applies electrical energy from a battery voltage source to a dc drive motor for rotating it in either direction, and the circuitry employed is simply a matter of connecting voltage to the particular type motor employed. A three-position switch 74 is located on the motor gear box cover 52. The switch has a central "off" position and an up and down position so that when the switch is moved up, energy is supplied to the motor 66 to rotate the shaft 56 in the direction required to extend the support post member 30 to raise the trailer; and when the switch 74 is moved in the downward position, the motor 66 is energized in the manner necessary to rotate the shaft 56 in the opposite direction to retract the support post member 30 and thereby lower the trailer.

FIG. 5 shows a battery box 76 having a battery 78 shown schematically therein. A cable 80 extends from battery 78 to the gear motor. The battery box 76 may be carried in the truck 18 to supply the electrical energy for raising and lowering the trailer or it may be mounted on the trailer forward wall 24. Another arrangement includes the use of the battery in the towing truck 18 or if connection and disconnection of the trailer and the truck is to be accomplished only at places where a house wiring is available, the electrical energy may be supplied from an ac voltage source by means of the use of a converter to the dc voltage necessary to properly energize the electric motor 66.

The placement of switch 74 is preferably arranged such that the operator can see the lower end of the trailer gooseneck structure 16 and the truck pivot connection 26. In this way, the operator can watch the relationship of these two components when the truck is being positioned for engagement with the trailer and lower the trailer at the proper time so that the lower end of the gooseneck structure 16 properly engages the pivot connection 26. If the truck is being operated by a driver, the operator of switch 74 can give instructions or hand motions to the truck operator to coordinate the positioning of the truck with the lowering of the trailer to expeditiously engage the trailer and truck.

As shown in FIG. 4, the shaft 32 has an extension 32A in the direction opposite that end which connects to gear 60. Removably attached to the shaft extension 32A is a crank 82 which may be connected to the shaft 32A such as by a coupling member 84. In the event of power failure, that is, in the event battery 78 does not have sufficient electrical energy to drive motor 66 or in the event of the failure of the motor, solenoid components 70, or the like, the trailer can be raised manually by means of crank 82.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:

1. In combination,
   a trailer having opposed paralleled sidewalls and having wheels and a forwardly extending portion having the lower edge thereof of increased ground height clearance providing a vertical trailer surface forwardly of said trailer wheels and between said trailer sidewalls;
   a downwardly extending fifth wheel connector type arrangement for removably coupling said trailer to a pivotal connection carried by a towing vehicle;
   an elongated vertical housing affixed to the trailer vertical surface (a) rearwardly of said trailer fifth wheel connector, (b) centrally between said trailer sidewalls, and (c) forwardly of said trailer wheels;
   a vertical support post member telescopically and downwardly extending from said housing, the lower end thereof being adaptable to engage the earth's surface;
   a horizontal plate affixed to said vertical support post member and having a threaded opening therethrough;
   a vertically externally threaded shaft received in said plate threaded opening and coaxially of said housing and said support post member;
   a gear affixed to the upper end of said vertical support member whereby the gear rotates the vertical axis of the post member;
   a horizontal shaft rotatably received by said housing in the upper portion thereof;

a worm gear affixed to said horizontal shaft and in engagement with said horizontal gear affixed to said vertical threaded shaft whereby the rotation of said horizontal shaft in one direction telescopically downwardly extends said support post member to engage the earth's surface and lift said trailer forward end, and rotation of said horizontal shaft in the opposite direction upwardly withdraws and support post to lower said trailer onto a towing vehicle pivotal connection;

a second gear on said horizontal shaft;

an electric powered gear motor drive supported on said trailer vertical surface centrally between said trailer sidewalls and directly above said vertical housing, the gear motor drive having a horizontal drive shaft extending therefrom having a drive gear thereon;

a chain coupling said gear motor drive gear to said horizontal shaft second gear;

a source of electrical energy; and reversing switch means connecting said source of electrical energy to said gear motor drive whereby said support post member may be extended or withdrawn to raise and lower the forward portion of said trailer.

2. An electrical lift for a trailer according to claim 1 wherein said horizontal shaft includes an extension from said housing in the direction opposite said second gear affixed thereto, and including a crank member removably attachable to said horizontal shaft extension whereby said shaft may be rotated manually to extend or retract said vertical support post member to raise or lower the forward portion of the trailer.

* * * * *